United States Patent [19]

Pretini

[11] 4,308,803

[45] Jan. 5, 1982

[54] PROTECTIVE DOOR SYSTEMS

[76] Inventor: Gisberto Pretini, Pisa, Italy

[21] Appl. No.: 111,003

[22] Filed: Jan. 10, 1980

[30] Foreign Application Priority Data

Jan. 31, 1979 [IT] Italy ................................ 9332 A/79
Feb. 13, 1979 [IT] Italy ................................ 9343 A/79

[51] Int. Cl.³ ........................ G08B 13/00; H04N 7/18; E06B 5/00

[52] U.S. Cl. ........................................... 109/3; 109/21

[58] Field of Search ................. 109/3, 6, 8, 21; 52/65, 52/64

[56] References Cited

U.S. PATENT DOCUMENTS

| | | | |
|---|---|---|---|
| 1,611,787 | 12/1926 | Snavely | 109/3 |
| 2,283,542 | 5/1942 | Dorsey | 109/8 |
| 3,045,615 | 7/1962 | Atchison | 109/3 |
| 4,060,039 | 11/1977 | Lagarrigue | 109/3 |
| 4,174,594 | 11/1979 | Panzini | 52/65 |

*Primary Examiner*—Reinaldo P. Machado
*Attorney, Agent, or Firm*—McGlew and Tuttle

[57] ABSTRACT

A protective door system is provided by a fixed wall and a mobile wall which has the shape of a sector of a cylinder with its axis arranged vertically. The mobile wall is rotatable about said axis between first and second operational positions. In the first operational position a first aperture is opened between the fixed and mobile walls which allows entry of a person from the exterior into a space between the walls and the walls co-operate to prevent passage from the space into the protected room. In the second operational position, a second aperture is opened between the walls which allows a person in the space to pass into the room and the walls co-operate to prevent passage from the exterior into the space. Automatic control means are provided for blocking the passage through the door of any unwanted persons.

10 Claims, 9 Drawing Figures

PROTECTIVE DOOR SYSTEMS

FIELD OF THE INVENTION

The invention relates to door systems which give protection against unauthorised entry through the door of unwanted persons.

DESCRIPTION OF THE PRIOR ART

In the field of doors giving protection for banks and similar offices, bullet-proof glass panels in aluminum sections are normally used to define a corridor or access chamber with doors of the wing, sliding, angular or revolving type installed at either end of the corridor or in the chamber walls for client transit. The opening and closure of the doors are normally controlled by electromechanical devices and means operated by the staff (or by guard personnel), by pushbuttons installed at suitable points, or alternatively are controlled automatically by photoelectric cells or other means, such as preset footboard switches, metal detectors being used for detecting armed persons.

Protection equipment of this type which comprise doors at the ends of corridors all suffer from certain operational deficiencies, and in particular they slow down the transit of clients because normally their operation is based on alternate locking and unlocking of the doors and is not continuous (i.e. one door opens when the other is closed). Further their operation is not automatic but instead is controlled by mechanical and electronic devices or means. Furthermore, some doors in particular sliding doors, require a corridor of a particular width, while revolving doors, although allowing greater flow in both directions, require more available space for their installation than sliding doors.

In recent years, in order to cope with their increased work, many banks have had to expand the space reserved to their staff, and this has obviously meant moving the counter with the result that space for the public is reduced.

SUMMARY OF THE INVENTION

According to the invention, there is provided a robbery protection door system for providing a passage into a protected room from the exterior of the room, the door system comprising a fixed wall, a movable wall in the form of a sector of a cylindrical surface arranged with the axis thereof vertical, manually operable means for rotating the movable wall about said vertical axis between a first operational position in which the movable wall and the fixed wall define a first aperture there between for the passage of a person from the exterior of the room into a space surrounded by said walls and also co-operate to prevent passage of said person from the space into the protected room, and a second operational position in which the movable wall and the fixed wall define a second aperture for the passage of a person from the space into the protected room and also co-operate to prevent passage of a person from the exterior of the room into the space, automatic control means for checking persons using the door system and for blocking the passage of any person failing the check.

The door of the present invention can be used as a door at the end of a corridor of bullet-proof glass of the kind described in Italian Pat. Nos. 938,606 and 1,013,526, British Pat. No. 1,403,560, U.S. Pat. No. 3,924,546 and West German Pat. No. 2,248,637 in the name of the same applicant as the present patent application, at least one of the ends comprising an angular door arranged to allow suitable checks to be made, and also able to block any person considered dangerous, all within a very small overall size.

The two apertures successively formed allow transit between the outside and inside of the room by means of two successive and opposite angular movements of the mobile wall. A third door (advantageously of the single wing type) may be installed between the second aperture and the protected room and which can be locked and released by guard personnel.

The system can also comprise means for allowing guard personnel to lock the mobile wall in a position intermediate said first and second operative positions in which the fixed wall and the movable wall define at least one aperture therebetween through which a person cannot pass.

The control means may include a footboard switch arranged between the first aperture and the exterior, the control means locking if the weight of more than one person acts on the footboard switch.

Consequently, this embodiment of the door system offers protection against the taking of hostages by potential robbers, because if two persons stand simultaneously on the footboard switch, the mobile wall is not released, and therefore one of the persons on the footboard switch must necessarily move backwards to allow the other to pass. The robbers will realise that they are unable to coerce the staff into opening the door by threatening to kill the hostage because the staff are unable to release the mobile angular door when in that particular position. It should be noted that as soon as the hostage has passed into the protected room, the mobile door can be set by the staff in an intermediate position, and the initial displacement of the wall to this position is sufficient to forbid transit to the robber who might feel inclined to follow the person passing through.

Once the mobile wall has been released, it can be operated either manually or automatically by a drive which is controlled by the footboard switch, and which can be locked at any moment by the guard personnel and possibly by an armed person detector disposed inside (or outside) the space defined by the fixed and mobile walls.

According to a further embodiment of the invention the mobile wall may be rotatable to a rest position between the first and second operational positions in which both apertures are closed and in which the fixed wall and the movable wall co-operate to prevent access from the exterior to said space and from said space to the protected room and wherein the automatic control means include a locking footboard switch disposed in the space within the fixed and movable walls, the locking footboard switch being preset such that when a weight greater than the weight of one person and less than the weight of two persons acts on the locking footboard switch, the mobile wall is locked to prevent passage from the space into the protected room. This locking can be effected when both the first and second apertures are closed, during the movement to the second operational position following the opening of the first aperture. The operation of the locking footboard switch may allow the mobile wall to be moved to said first operational position but prevents movement of the mobile door to the second operational position.

In this further embodiment when said mobile wall is in the rest position, the mobile wall and the fixed wall completes a cylindrical space around the imaginary vertical geometrical axis of the walls, so as to close both the apertures and prevent transit between the outside and the protected room. An initial displacement of the mobile wall to the first operational position opens the first aperture to allow entry into the interior of the cylindrical space. If the weight on the footboard switch is greater than the set weight, the mobile wall is locked in the rest position during its return rotational movement from the first to the second operational position so that the movement is not continued to open the second aperture, although it may be reversed in order to reopen the first aperture.

As the operation of the set footboard switch is made such that it cannot be interfered with by persons in the room, this door system prevents a hostage and a robber entering together, because their combined weight will exceed the weight of one person necessary to operate the footboard switch to open the second aperture.

When the mobile wall is locked in a single direction only, i.e. such that said wall can be returned to the first operational position to allow the first aperture to be opened, a robber can escape with his hostage.

The mobile wall can be moved either manually or automatically, using a drive controlled by the footboard switch.

The automatic control means may include protection means, controlled from the protected room, for stopping the rotation of the mobile wall and locking it in any position, said means being operable independently of the locking footboard switch.

This feature allows the mobile wall to be locked in the rest position so that a robber knows that he can be locked between the two walls together with the hostage. This is a factor which is essentially of psychological value, but undoubtedly dissuades a robbery attempt, because of an increased risk run by the robber. Said means must not interfere with the operation of the preset footboard switch, i.e. these means must have their own connections and be autonomous in service.

The mobile wall can also be controlled by a metal detector, used to detect armed persons, but taking into account the aforesaid operational limitations.

BRIEF DESCRIPTION OF THE DRAWINGS

The invention will be more apparent from the following description of some embodiments of the invention, by way of example, reference being made to the accompanying drawings in which.

DESCRIPTION OF THE PREFERRED EMBODIMENTS

Figure 1:
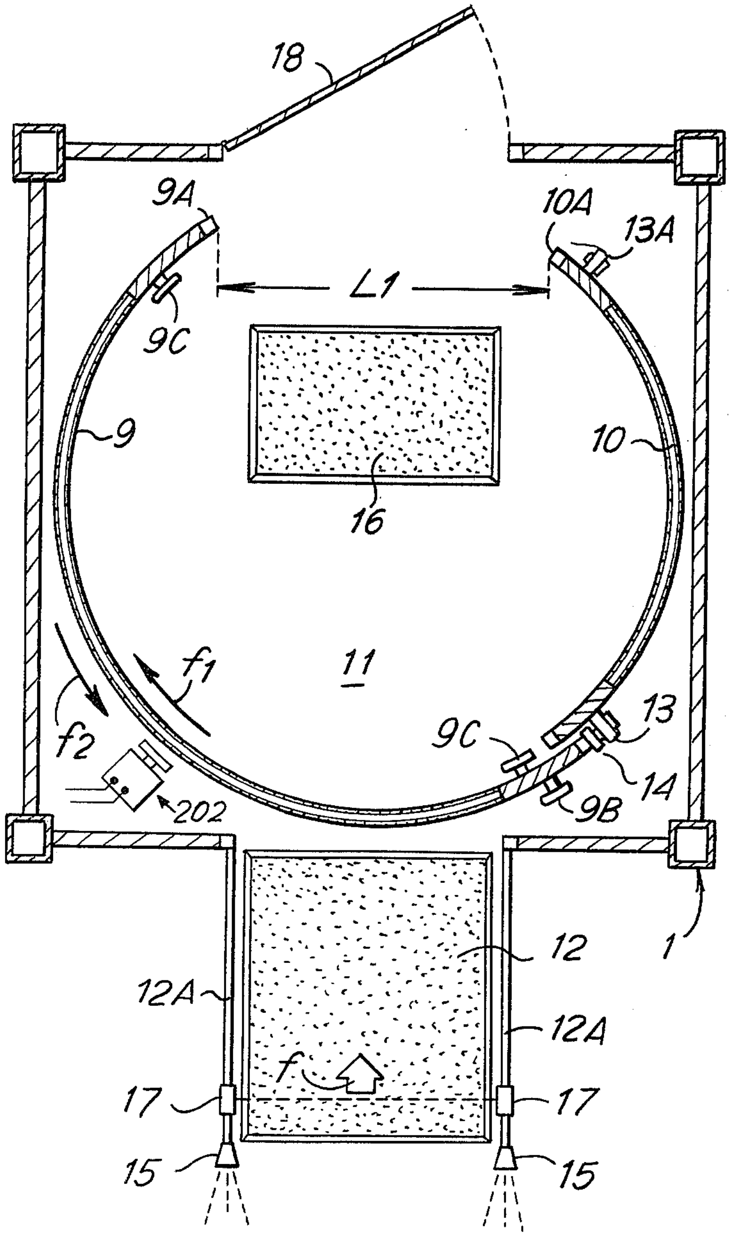
FIG. 1 is a diagrammatic cross-section of a first embodiment of a robber protection door system in a position in which the door is closed across a first of two apertures through the door.
Figure 2:
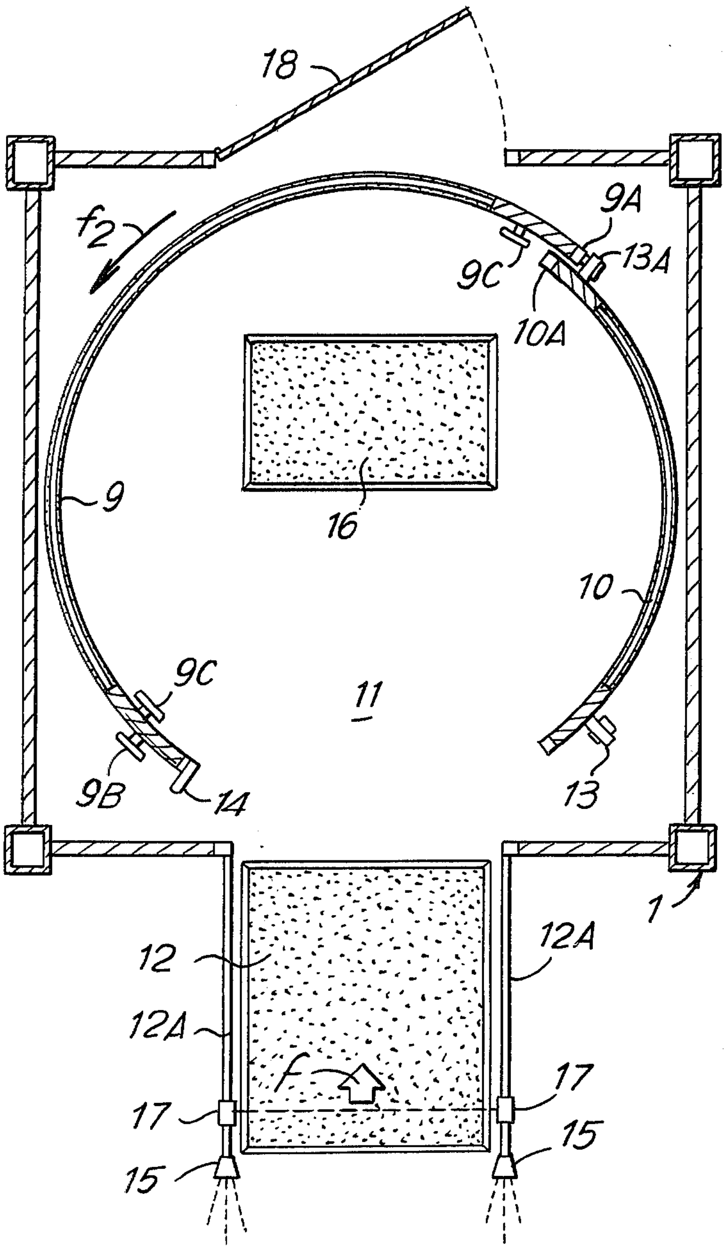
FIG. 2 shows the door system of FIG. 1 in a position in which a second aperture is closed.

Referring to FIGS. 1 to 5 of the drawings, the supporting structure 1, defines a space in which the door is arranged. The structure 1 comprises a central support 3 above the door and carrying a rolling bearing having an inner ring which engages a core 5 which supports upper spokes 6 of a rotating assembly which is centred at a lower end thereof (FIG. 5) by a bearing 5A, and which comprises lower spokes 7 which engage with a lower section 8 running on wheels 8A.

The rotating assembly comprises a mobile wall 9 in the form of a sector of a cylindrical surface. The wall subtends an angle of slightly more than 180° and has a diameter of the order of 1 metre which may be varied according to the requirements of the system. Said mobile wall co-operates, and is combined with, a fixed wall 10, which is also in the form of a sector of a cylindrical surface having a diameter slightly different from the diameter of the wall 9, it being shown as less on the drawing but it could be of greater diameter. The axis of the fixed wall 10 is coaxial with the axis of the mobile wall 9. The reference numeral 11 indicates a platform inside the cylindrical space between the walls 9 and 10; the reference numeral 12 indicates a footboard arranged to lock the wall 9 either before or during its opening if the weight on the footboard exceeds the weight of a single person. Two side walls are indicated by 12A.

The mobile wall 9 is movable between first and second operational positions. In the first operational position shown in FIG. 2, the movable wall 9 and the fixed wall 10 define a first aperture therebetween for the passage of a person from the exterior into the space between the walls. In addition, the walls 9, 10 co-operate to prevent passage of the person from the space into the interior of the room. In the second operational position, shown in FIG. 1, the movable wall 9 and the fixed wall 10 define a second aperture L1 for a passage of a person from the space between the walls into the protected room and also co-operate to prevent passage of a person from the exterior of the room into the space.

The mobile wall 9 returns to the second operational position shown in FIG. 1, in which the two walls 9 and 10 are adjacent and are slightly overlapped on the room entrance side, by the action of a weight such as a counterweight on an inclined plane or by the action of resilient means such as a mechanical or pneumatic spring. This prevents access to the space between the walls 9, 10 in the direction of the arrow F. This means that the second aperture L1 in FIG. 1 is maintained in the open position shown. The aperture L1 can be of the order of 50–60 cm wide, and such as to allow transit of one person.

The wall 9 is locked if the weight of more than one person acts on the footboard 12, and cannot be released by guard personnel. However (if considered advantageous), a second locking and release device can be installed for operation by guard personnel. However, this locking and release device must not interfere with the operation of the footboard switch.

When the wall 9 is released, a person who wishes to enter the room must hold a knob 9B and rotate the wall 9 in the direction of the arrow $f_1$ to the first operational position so forming a passage giving access into the cylindrical space defined between the walls 9 and 10 and automatically closing the aperture L1 by bringing together the edges 9A and 10A of the walls 9, 10.

A person who has entered into the cylindrical space between the walls 9 and 10 can pass freely through the aperture L1 defined between edges 9A and 10A of the walls 9 and 10, after the mobile wall 9 has returned to the second operational position shown in FIG. 1.

A footboard switch 16 (FIG. 3) inside the cylindrical space between the walls 9 and 10 and disposed on the platform 11 controls a single wind door 18 which can also be locked and released by guard personnel. It would also be possible for the aperture L1 to be able to be opened by movement of the movable wall 9 in the direction $f_2$, but without any action being necessary from within the room to allow such opening. Further, it would be possible for one or other or both the operations in the directions $f_1$ (FIG. 1) and $f_2$ (FIG. 2) to be carried out by means of a drive controlled by the footboard switches 12 and/or 16, with control and locking possible by the personnel inside the room.

The operational state of the door is indicated by a light signal 15. When the first aperture is closed, a microswitch installed at 13 and pressed by the mobile wall 9 keeps a green light alight to indicate free passage. When a person stands on the footboard 12, a red light signal is operated by a photoelectric cell system disposed at 17, and the red light signals to any person following the person on the footboard to wait until the green light reappears, which occurs when the mobile wall returns to the position shown in FIG. 1 in which said wall acts on the switch 13.

An inspection and image recording system using an optical eye 20 (FIG. 3) combined with a television recorder or the like can be provided for checking persons in the process of entering or who are already in the cylindrical space, the image recording being suitably preserved for an adequate time.

Figure 3:
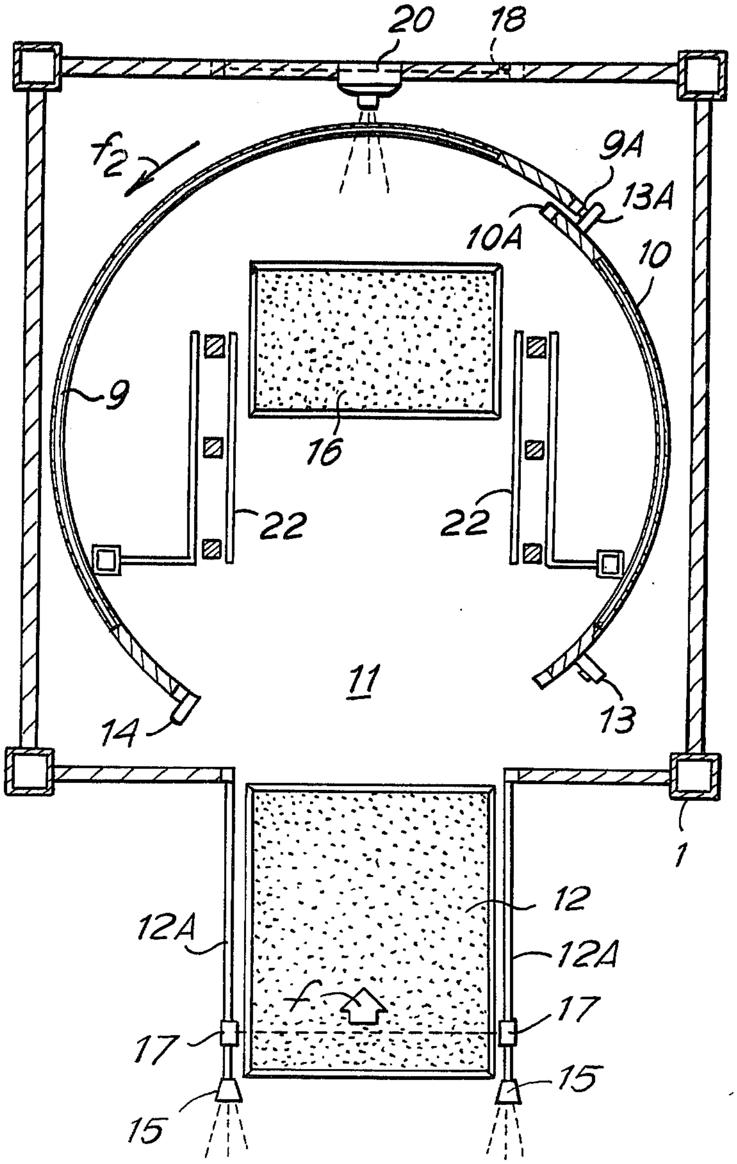
FIG. 3 shows the door system of FIGS. 1 and 2 provided with an armed person detector and a television detector.
Figure 4:
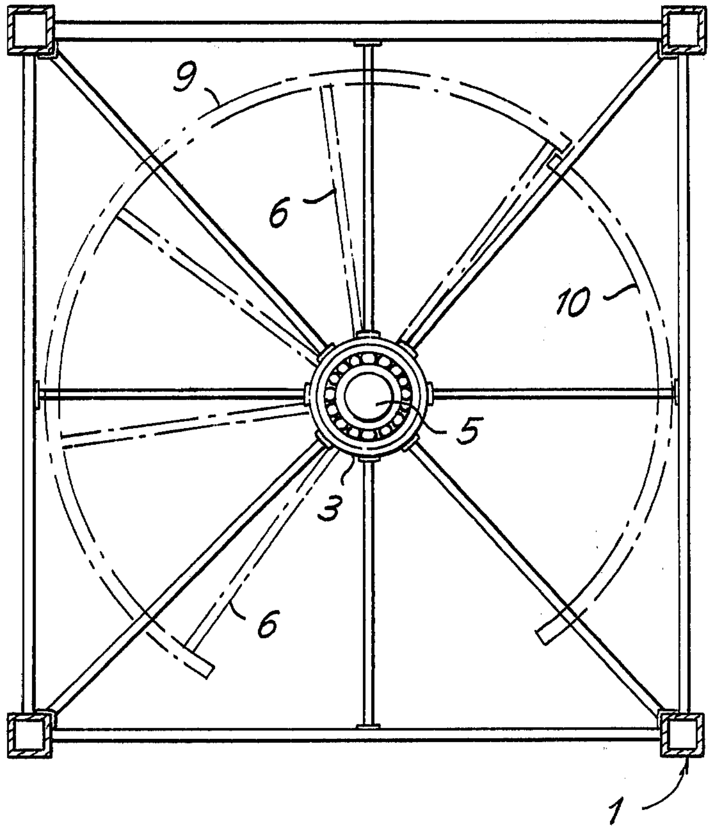
FIGS. 4 and 5 are a plan view of a supporting structure of the door system of FIGS. 1 and 2 and a vertical section through a detail of the supporting structure, respectively.
Figure 5:
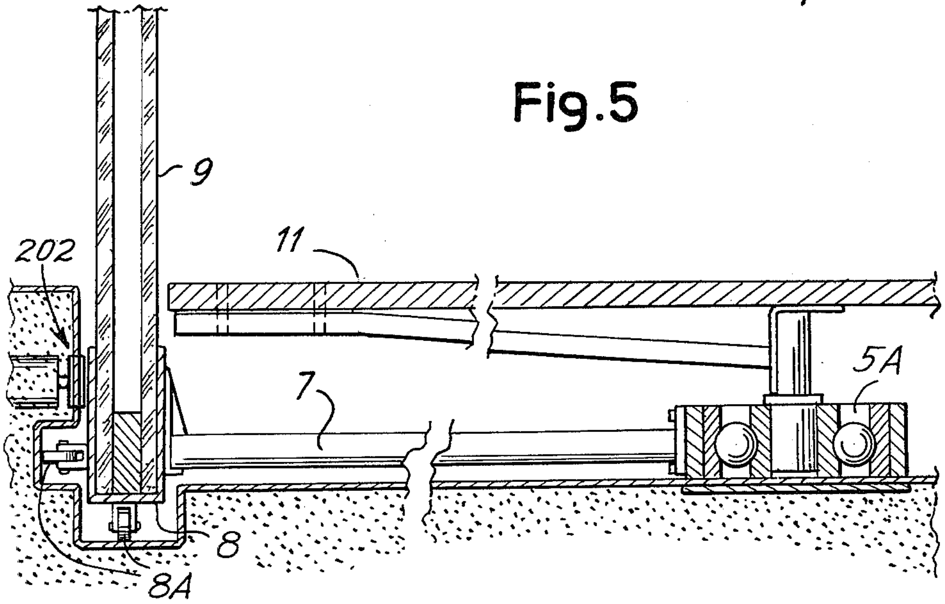

As shown in FIG. 3, an armed person detector in the form of a metal detector 22 can be provided in the cylindrical space bounded by the walls 9 and 10 (or outside the support structure), in order to lock the door 18 if an armed person comes between the walls 9 and 10.

Alternatively, an armed person detector can be disposed in a position before the walls 9 and 10.

The mobile wall 9 has an angle of operation of less than 360° and thus requires sufficiently little space that a door having apertures of 60–65 cm can be installed in a corridor only 1 meter wide. Operationally, the performance of such a door is better than wing doors or sliding doors, which have always to be installed with an alternate locking and unlocking system and are not continuous and automatic.

The embodiment described above with reference to the drawings provides protection against the taking of hostages because as soon as the mobile door opens the second aperture to give access to the protected room, the first apertures from the exterior closes.

The operational performance of the described door can be maximised, and the protection given by the door against the taking of hostages be increased, if two doors are installed, one as an entrance to the protected room and the other as an exit to the protected room. The most convenient number of doors will be determined by the number of persons passing through the room in which they are to be installed. If only one mobile door is installed, it must be provided with a second knob 9C (FIG. 1) for the use of persons leaving the protected room.

Figure 6:
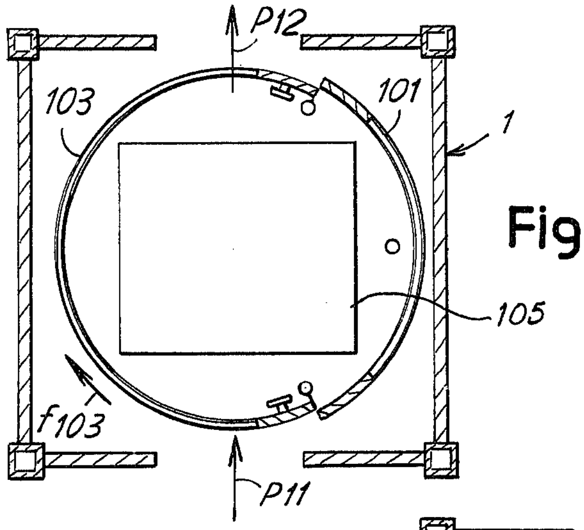
FIG. 6 shows a second embodiment of a robbery protection door system in a rest position.
Figure 7:
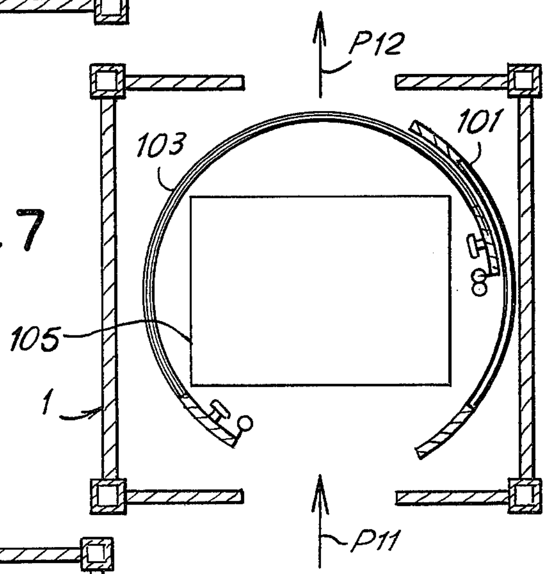
FIG. 7 shows the second embodiment in a position in which transit is possible through a first aperture.
Figure 8:
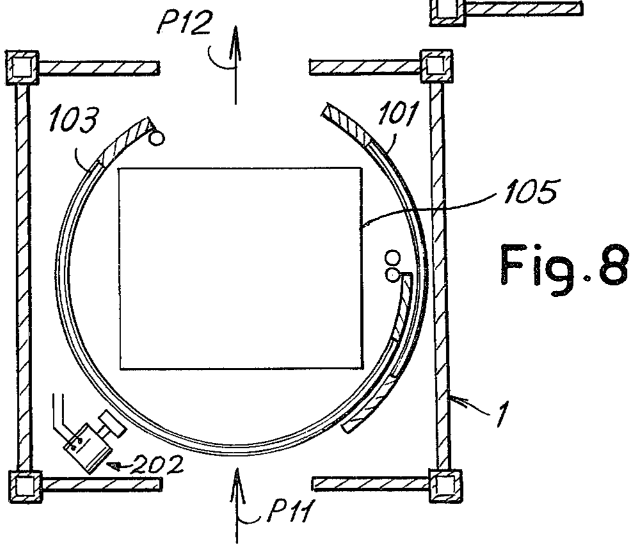
FIG. 8 shows the second embodiment in a position in which transit is possible through a second aperture.

FIGS. 6, 7 and 8 show only the structure related to the operation of the embodiment of door systems shown in these Figures. The reference numeral 101 indicates a part-cylindrical fixed wall which subtends an angle of about 120°. A mobile wall 103 is provided which is also part-cylindrical and which is arranged inwardly of the fixed wall 101. The mobile wall 103 subtends an angle at least complementary to that of the fixed wall 101. The mobile wall 103 can be moved manually in the direction of the arrow $f_{103}$ from a rest position shown in FIG. 6 to a first operational position and can be moved in the reverse direction to said arrow either manually, or preferably, by a pneumatic or other resilient system to a second operational position. In the cylindrical space defined between the two walls 101, 103, the floor includes a footboard switch 105 sensitive to weight, or preset.

In the rest position shown in FIG. 6, the position of the wall 103 is such that a first passage through a first aperture between the fixed and movable walls 101, 103, and into the space indicated by the arrow P11, and the second passage from the space through an aperture between the fixed and movable walls 101, 103 and into the protected room, indicated by the arrow P12, are both obstructed. When a user wishes to enter, he moves the wall 103 in the direction of the arrow $f_{103}$ until it reaches the first operational position shown in FIG. 7, to allow transit into the cylindrical space defined between the walls 101 and 103 in the direction of the arrow P11. On releasing the operating knob, the wall 103 returns from the position shown in FIG. 7 to the rest position shown in FIG. 6. If only one person has entered through the passage defined by the arrow P11, a weight less than the preset weight acts on the footboard switch 105, and this allows the person to move the wall 103 from the position shown in FIG. 6 to the second operational position shown in FIG. 8 in order to open the passage indicated by the arrow P12. If a weight exceeding the preset weight (which equals the minimum weight which two persons can have) acts on said footboard switch, the wall 103 is locked by the footboard switch so that it either remains in the first operational position or returns to the rest position of FIG. 6, but in either case the locking action of the footboard switch prevents it reaching the second operational position of FIG. 8 for opening the second aperture. The wall 103 can again be moved in the direction of the arrow $f_{103}$ from inside the cylindrical space so as to allow people to leave, but the simultaneous transit of two people into the protected room is not possible. The wall 103 locked in the aforesaid manner by the footboard switch cannot be released from inside the protected room, so that any criminal action based on a hostage being forced to enter the room together with a robber is impossible. The facility for allowing movement of the wall 103 to open the passage P11, even under locked conditions, allows the robber to escape.

Figure 9:
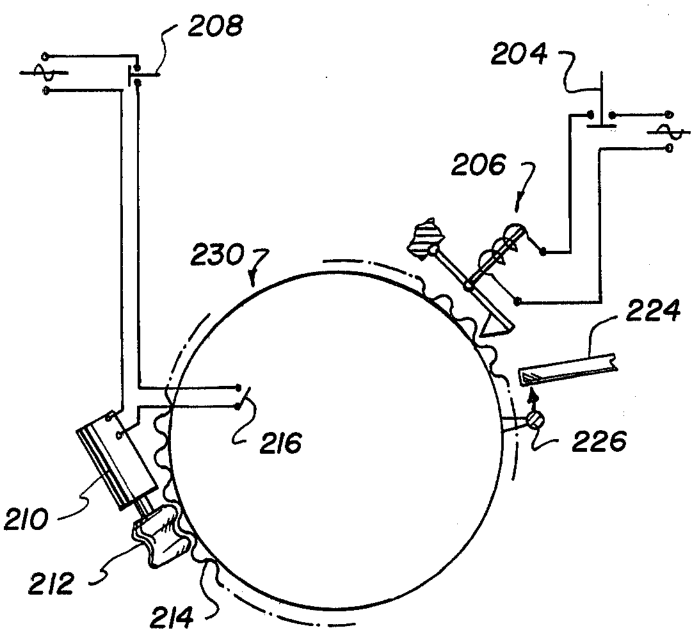
FIG. 9 is a schematic representation of means for driving and locking a mobile wall.

Means for locking and driving the mobile wall will be readily apparent to those skilled in the art. An exemplary arrangement is shown in FIG. 9. Locking means 202, schematically illustrated in FIGS. 1, 5 and 8, can consist of a friction sliding block and the control can be an electromagnetic control in a direction (e.g., to maintain release) and a spring control in the opposite direction (for example in order to lock the mobile wall a button control 204, see FIG. 9, can be provided) which can be operated by the personnel in the protected room. Further, button 240 could control a brake pin 206 operating with a toothing 230 in the mobile wall. Also, a button 208 can be provided which opens the circuit of an engine 210, for operating the mobile wall, for example, by means of an irreversible transmission with an endless screw 212 and a helical wheel 214 on the mobile wall, or by means of a self-braking engine.

Engine 210 and transmission arrangement 212–214 are illustrated in FIG. 6. A motor gear can also be provided for operating a gear integral with a unit 7–9, that can be seen in FIG. 5, close to bearing 5A. The engine 210 can be controlled by a switch 216 operated by the footboard when a weight, even a small weight, acts upon it.

The footboard 16 acts like a balance or a platform scale and can move an arm 224 to interfere with the trajectory of a pin 226 carried by the mobile wall, so as to stop said wall. This occurs when, on footboard 16 or 105, the calibration weight is exceeded (said calibration weight is less than the average weight of two persons, and greater than the weight of one person).

The drawing shows only one embodiment of the invention by way of example, and modifications can be made to the shapes and arrangements without departing from the scope of the inventive idea as defined by the appended claims.

I claim:

1. A robbery protection door system for providing a passage into a protected room from the exterior of the room, the door system comprising a fixed wall, a mobile wall in the form of a sector of a cylindrical surface arranged with the axis thereof vertical, manually operable means for rotating the mobile wall about said vertical axis between a first operational position in which the mobile wall and the fixed wall define a first aperture therebetween for the passage of a person from the exterior of the room into a space surrounded by said walls and also co-operate to prevent passage of said person from the space into the protected room, and a second operational position in which the mobile wall and the fixed wall define a second aperture for the passage of a person from the space into the protected room and also co-operate to prevent passage of a person from the exterior of the room into the space, automatic control means for checking persons using the door system and for blocking the passage of any person failing the check, and said control means including a footboard switch arranged between the first aperture and the exterior, the control means locking the mobile wall if the weight of more than one person acts on the footboard switch.

2. A system as claimed in claim 1 wherein, if the control means lock the mobile wall in the first operative position as a result of operation of the footboard switch, the mobile wall cannot be relased by guard personnel.

3. A system as claimed in claim 1 wherein the control means include a device which when the mobile wall is in the second operative position, allow the mobile door to be locked and released by guard personnel independently of the locking action of the footboard switch.

4. A system as claimed in claim 3 wherein once released by said device, means are provided for locking of the mobile wall by guard personnel in an intermediate position between the first and second operative positions in which the fixed wall and the mobile wall define at least one aperture therebetween through which a person cannot pass.

5. A system as claimed in claim 1 wherein drive means are provided for rotating the mobile wall, the drive means being controlled by the control means.

6. A robbery protection door system for providing a passage into a protected room from the exterior of the room, the door system comprising a fixed wall, a mobile wall in the form of a sector of a cylindrical surface arranged with the axis thereof vertical, manually operable means for rotating the mobile wall about said vertical axis between a first operational position in which the mobile wall and the fixed wall define a first aperture therebetween for the passage of a person from the exterior of the room into a space surrounded by said walls and also co-operate to prevent passage of said person from the space into the protected room, and a second operational position in which the mobile wall and the fixed wall define a second aperture for the passage of a person from the space into the protected room and also co-operate to prevent passage of a person from the exterior of the room into the space, automatic control means for checking persons using the door system and for blocking the passage of any person failing the check, and wherein the mobile wall is rotatable to a rest position between the first and second operational positions in which both apertures are closed and in which the fixed wall and the movable wall co-operate to prevent access from the exterior to said space and from said space to the protected room and wherein the automatic control means include a locking footboard switch disposed in the space within the fixed and movable walls, the locking footboard switch being preset such that when a weight greater than the weight of one person and less than the weight of two persons acts on the locking footboard switch the mobile wall is locked to prevent passage from the space into the protected room.

7. A system as claimed in claim 6 wherein the operation of the locking footboard switch allows the mobile wall to be moved to said first operational position but prevents movement of the mobile wall to the second operational position.

8. A system as claimed in claim 6 wherein the locking footboard switch cannot be neutralised from inside the protected room.

9. A system as claim in claim 6 wherein the locking footboard switch locks the mobile wall as the mobile wall is returning from the first operational position to the rest position thereof, the locking of the mobile wall preventing continued movement of the mobile door from the rest position to the second operational position but allowing reversed movement of the mobile door from the rest position to the first operational position.

10. A system as claimed in claim 6 wherein the automatic control means include protection means, controlled from the protected room, for stopping the rotation of the mobile wall and locking it in any position, said means being operable independently of the locking footboard switch.

* * * * *